United States Patent
DeBruhl et al.

(10) Patent No.: US 10,801,727 B2
(45) Date of Patent: Oct. 13, 2020

(54) SYSTEM FOR COMBUSTOR COOLING AND TRIM AIR PROFILE CONTROL

(71) Applicant: Rolls-Royce North American Technologies Inc., Indianapolis, IN (US)

(72) Inventors: Christopher Dwayne DeBruhl, Indianapolis, IN (US); Timothy C. Roesler, Plainfield, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 483 days.

(21) Appl. No.: 16/029,206

(22) Filed: Jul. 6, 2018

(65) Prior Publication Data

US 2020/0011532 A1   Jan. 9, 2020

(51) Int. Cl.
| | |
|---|---|
| *F23R 3/46* | (2006.01) |
| *F23R 3/26* | (2006.01) |
| *F23R 3/04* | (2006.01) |
| *F23R 3/00* | (2006.01) |
| *F23R 3/02* | (2006.01) |

(52) U.S. Cl.
CPC ............... *F23R 3/26* (2013.01); *F23R 3/002* (2013.01); *F23R 3/02* (2013.01); *F23R 3/04* (2013.01); *F23R 3/46* (2013.01)

(58) Field of Classification Search
CPC .... F23R 3/26; F23R 3/46; F23R 3/002; F23R 3/02; F23R 3/04; F23R 2900/03041; F23R 2900/03042; F23R 2900/03044
See application file for complete search history.

(56) References Cited

U.S. PATENT DOCUMENTS

| | | |
|---|---|---|
| 3,741,678 A | 6/1973 | Arlington et al. |
| 3,965,066 A | 6/1976 | Sterman et al. |
| 5,220,795 A | 6/1993 | Dodds et al. |
| 5,289,686 A | 3/1994 | Razdan et al. |
| 6,554,562 B2 | 4/2003 | Dudebout et al. |
| 6,701,714 B2 | 3/2004 | Burd et al. |
| 2006/0130486 A1 | 6/2006 | Danis et al. |
| 2008/0202124 A1 | 8/2008 | Sutcu et al. |
| 2010/0003624 A1 | 1/2010 | Hicks et al. |

(Continued)

FOREIGN PATENT DOCUMENTS

| | | |
|---|---|---|
| JP | 2004-084601 A | 3/2004 |
| JP | 2004-301115 A | 10/2004 |

OTHER PUBLICATIONS

Extended European Search Report, issued in European Application No. 19177570.9, dated Jul. 31, 2019, pp. 1-36, European Patent Office, Munich, Germany.

*Primary Examiner* — Steven M Sutherland (74) *Attorney, Agent, or Firm* — Brinks Gilson & Lione (57) ABSTRACT

Systems and methods may be provided in which a combustion liner is configured to be included in an aft end of a combustor for a gas turbine engine. An aft seal may be movably engaged with the combustion liner in a seal engagement region. The combustion liner may comprise an inlet formed in an outer surface of the combustion liner to receive a cooling fluid, and an outlet in fluid communication with the inlet via a passageway formed within the combustion liner, the outlet disposed in an inner surface of the combustion liner in the seal engagement region.

19 Claims, 8 Drawing Sheets

(56) References Cited

U.S. PATENT DOCUMENTS

| | | |
|---|---|---|
| 2010/0034643 A1 | 2/2010 | Davis, Jr. et al. |
| 2012/0034075 A1 | 2/2012 | Hsu et al. |
| 2014/0033835 A1 | 2/2014 | Hendrikse et al. |
| 2014/0338351 A1 | 11/2014 | Snyder et al. |
| 2015/0300645 A1* | 10/2015 | Jopp ................ F23R 3/005 60/753 |
| 2016/0097325 A1* | 4/2016 | Harding ............ F23R 3/06 60/752 |
| 2016/0131364 A1* | 5/2016 | Burd ................ B23P 15/00 60/752 |
| 2018/0142563 A1 | 5/2018 | Commaret et al. |

\* cited by examiner

SYSTEM FOR COMBUSTOR COOLING AND TRIM AIR PROFILE CONTROL

TECHNICAL FIELD

This disclosure relates to gas turbine engines and, in particular, to a system for combustor cooling and/or trim air profile control.

BACKGROUND

Gas turbine engines may include a compressor, a combustor, and a turbine. Typically, the compressor is an air compressor rotating on a shaft of the engine to provide air for the combustion cycle. Parts of the turbine may be subject to relatively high temperatures, such as from exhaust gas discharged by the combustor. In some gas turbines, a cooling fluid, such as cooling air, may be used to cool parts of the turbine. Such cooling fluid may be supplied from the compressor, from another part of the gas turbine engine, or from an air supply external to the gas turbine engine.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
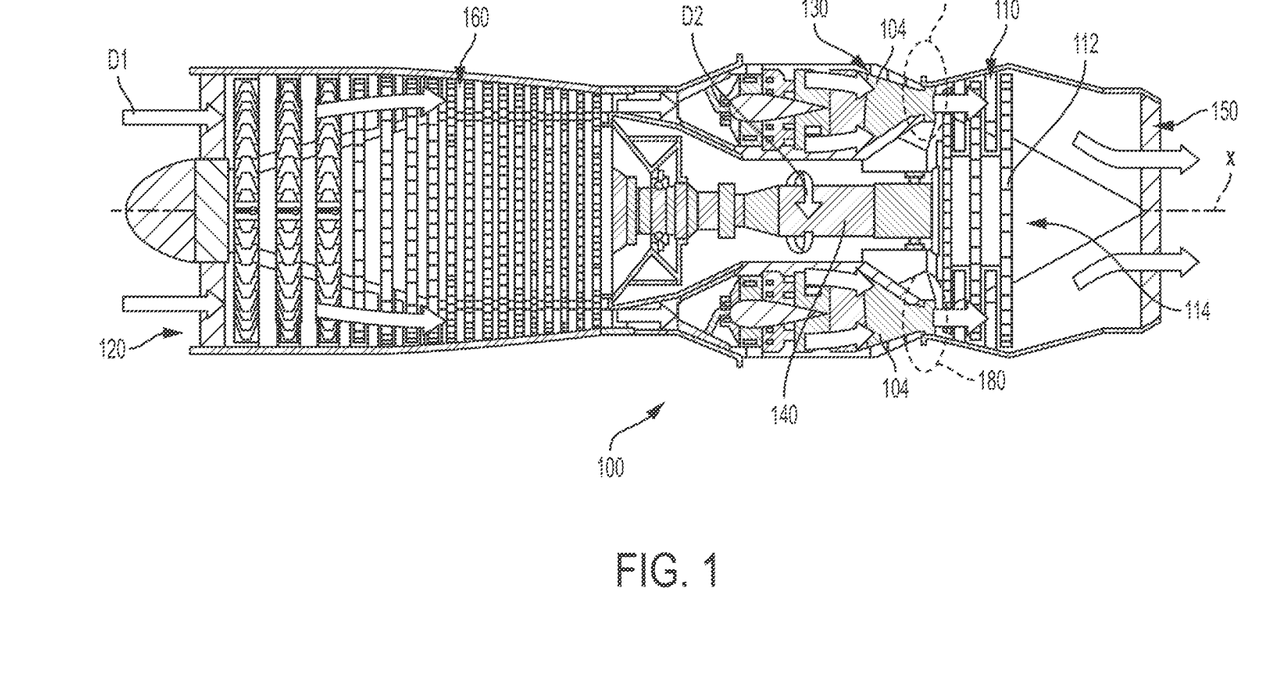
FIG. 1 is a cross-sectional view of a gas turbine engine.

By way of an introductory example, a combustion liner for a gas turbine engine may be provided. The combustion liner may include: a seal engagement region configured to couple with an aft seal; a plurality of cooling passages in the seal engagement region; a plurality of inlets to the cooling passages, the inlets located on an outer surface of the combustion liner; and a plurality of outlets for the cooling passages, the outlets located on an inner surface of the combustion liner in the seal engagement region, wherein the inner surface is configured to face radially inward toward a combustion chamber, and the outer surface is configured to face radially outward relative to the combustion chamber FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, and a perimeter defense or security system.

The gas turbine engine 100 may take a variety of forms in various embodiments. Though depicted as an axial flow engine in FIG. 1, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

A system for combustor cooling and trim air profile control may be located in an area 180 of the gas turbine engine 100 where the hot, high pressure fluid passes from a combustion chamber 104 of the combustion section 130 into the turbine section 110. An example of the system 102 for combustor cooling and trim air profile control is illustrated in FIGS. 2-7.

Figure 2:
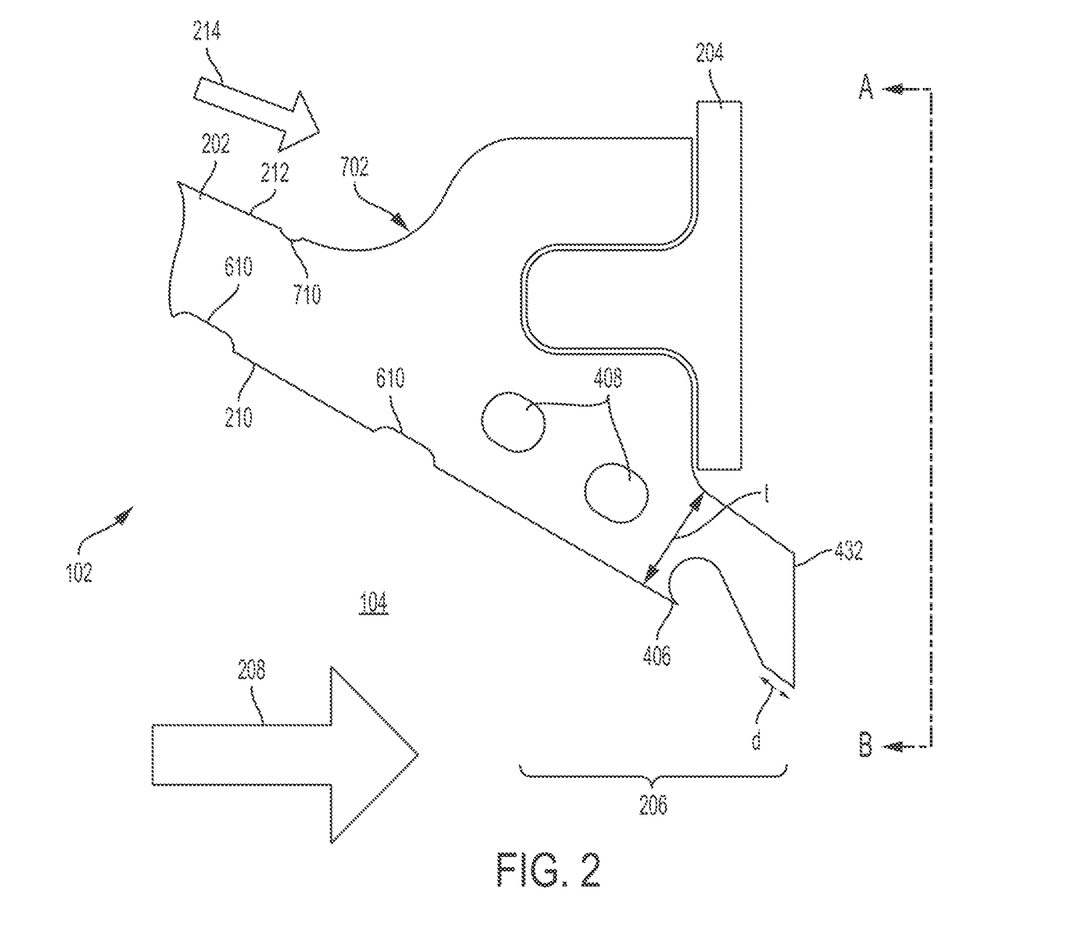
FIG. 2 is a cross-sectional view of an aft end of a combustion liner and an aft seal movably engaged with the combustion liner in a seal engagement region.

FIG. 2 is a cross-sectional view of an aft end of a combustion liner 202 and an aft seal 204 movably engaged with the combustion liner 202 in a seal engagement region 206. The seal engagement region 206 may include a portion of the combustion liner 202 configured to engage or otherwise couple to the aft seal 204. The combustion liner 202 is a component that may contain the combustion process. Alternatively or in addition, the combustion liner 202 may introduce one or more airflows such as cooling air. The combustion liner 202 may define at least part of the combustion chamber 104. The combustion liner 202 may be made of any material suitable to withstand the relatively high temperatures resulting from combustion of fuel, such as a metal alloy, a superalloy, and/or a ceramic matrix composite.

The aft seal 204 may couple to a high-pressure vane (not shown) located in the turbine section 110. A hot side 210 of the combustion liner 202 is called "hot" because the hot side 210 is designed to face the combustion chamber 104 through which relatively hot gasses flow along a primary gas flow path 208. Conversely, a cold side 212 of the combustion liner 202 is called "cold" because the cold side 212 is designed to have cooling fluid 214, such as cooling air, flow along the cold side 212. Accordingly, the adjectives "hot" and "cold" used in connection with the terms "hot side" and "cold side", respectively, refer to relative position, not to temperatures. For example, the hot side 210 may be referred to as an inner surface of the combustion liner 202 because the hot side 210 is configured to face radially inward toward the combustion chamber 104. Similarly, the cold side 212 may be referred to as an outer surface of the combustion liner 202 because the cold side 212 is configured to face radially outward relative to the combustion chamber 104.

The aft seal 204 is component configured to limit or prevent the cold air from escaping between the combustion liner 202 and the high-pressure vane located in the turbine section 110. The seal engagement region 206 may be a portion of the combustion liner 202 configured to engage or otherwise couple to the aft seal 204.

Figure 3:
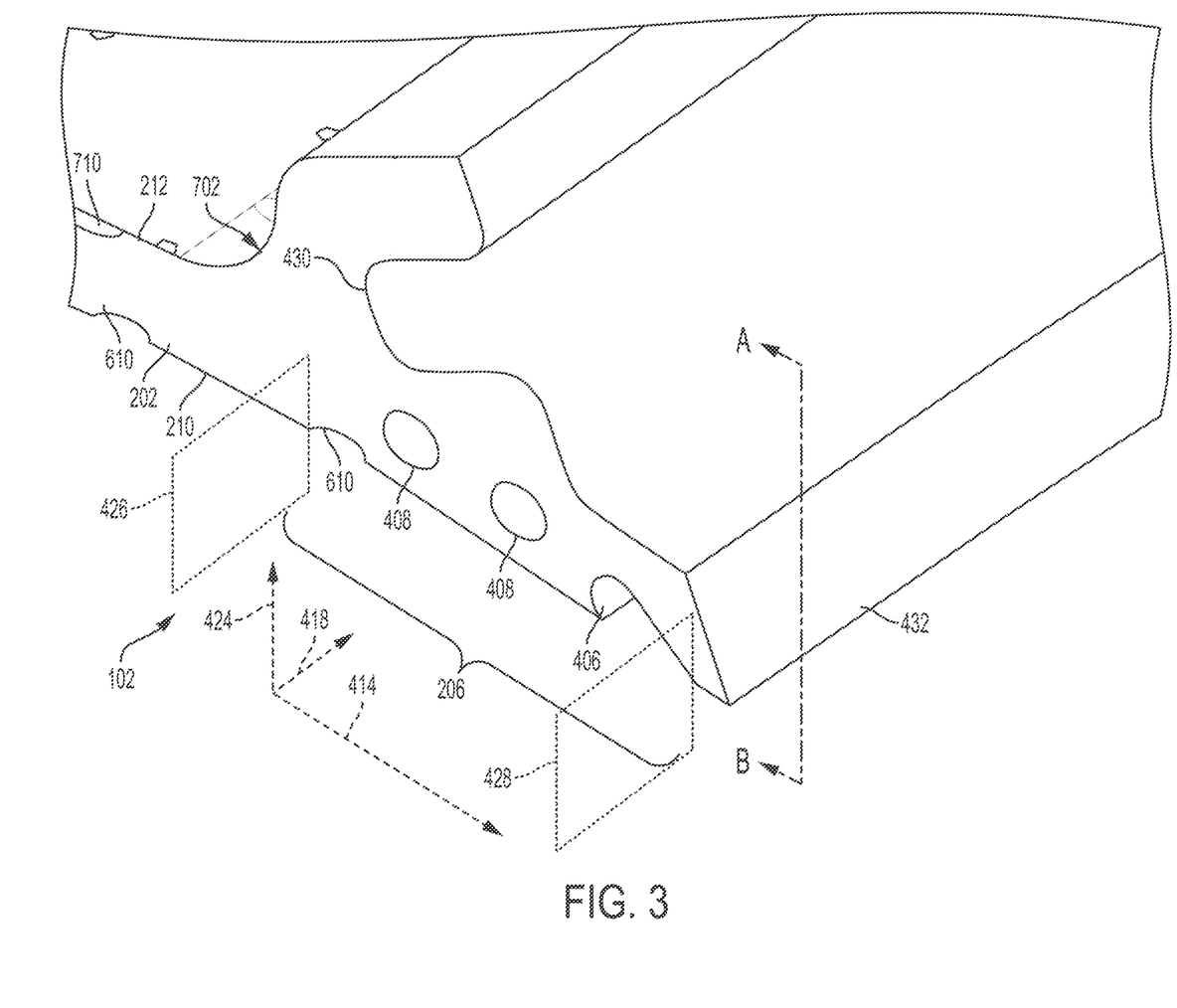
FIG. 3 is a perspective view of the aft end of the combustion liner.

FIG. 3 is a perspective view of the aft end of the combustion liner 202. The aft seal 204 is not shown in FIG. 2 so that features of the combustion liner 202 are not obscured by the aft seal 204. The cross-sectional view of the combustion liner 202 shown in FIG. 2 is the cross-section indicated by arrows A and B in FIG. 3.

Figure 4:
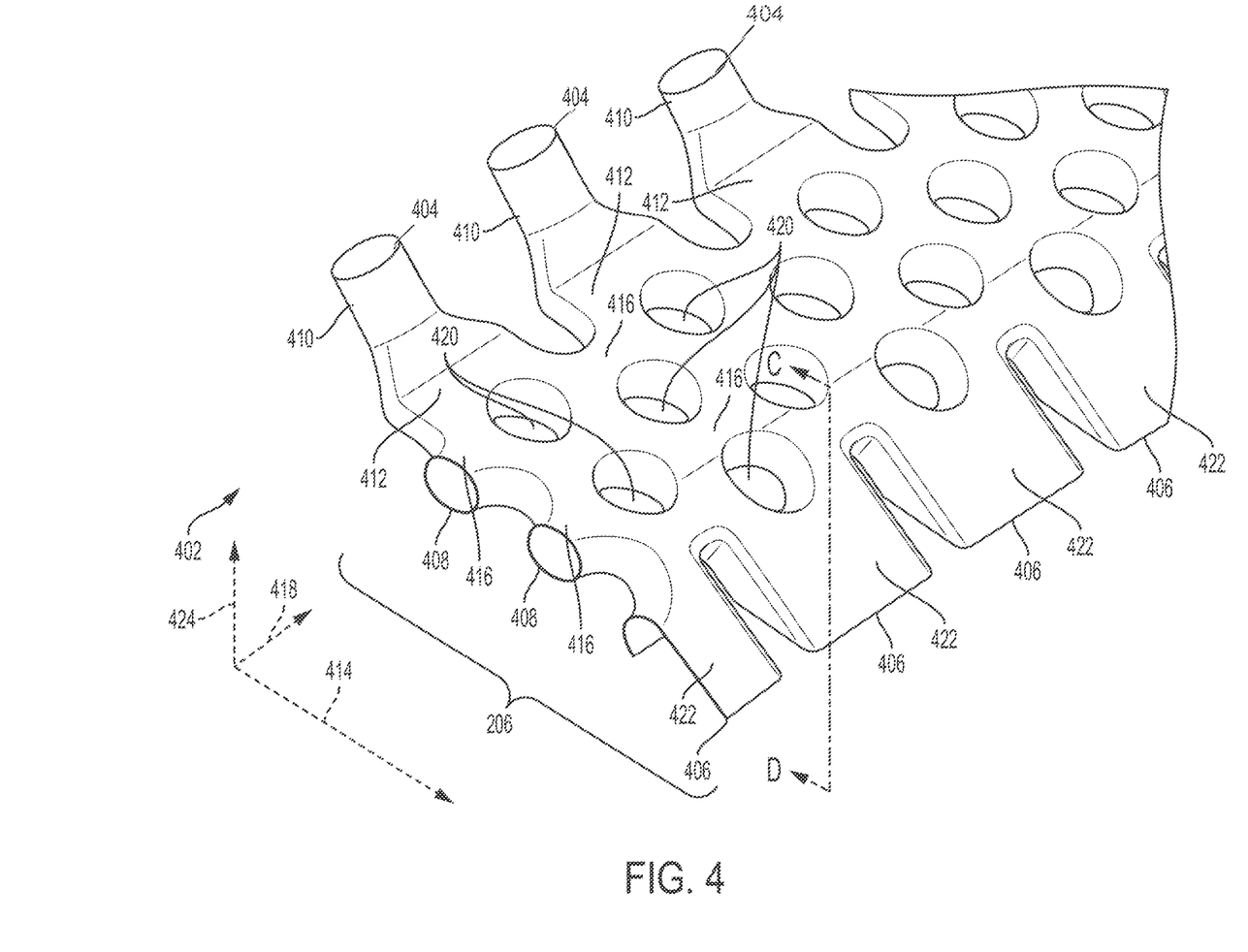
FIG. 4 is a perspective view of cooling passages, which are inside of the aft end of the combustion liner.

FIG. 4 is a perspective view of cooling passages 402, which are inside of the aft end of the combustion liner 202. The cooling passages 402 include inlets 404 and outlets 406. The cooling passages 402 are largely hidden from view in FIGS. 2-3. However, one of the outlets 406 is visible in FIGS. 2-3. In addition, portions 408 of the cooling passageways 402 that intersect the cross-section indicated by arrows A and B are shown in FIGS. 2-3.

Figure 5:
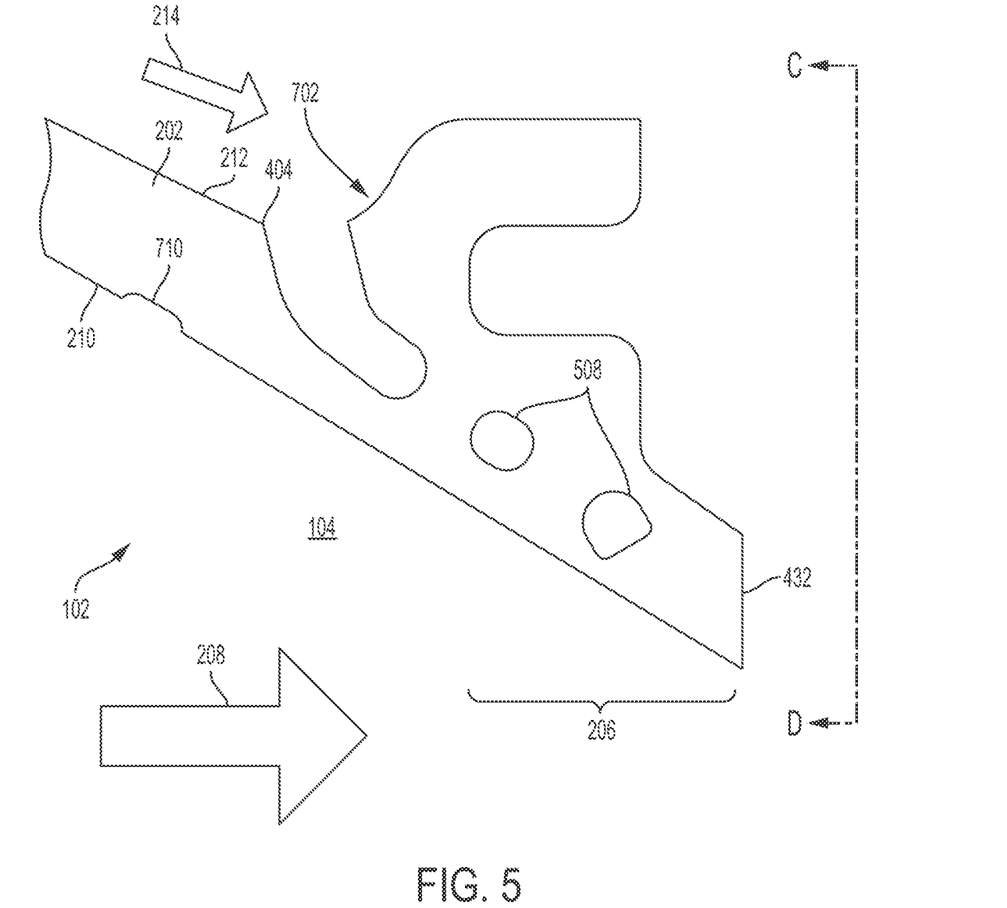
FIG. 5 is a second cross-sectional view of the aft end of the combustion liner.

FIG. 5 is a second cross-sectional view of the aft end of the combustion liner 202. The cross-sectional view of the combustion liner 202 shown in FIG. 5 is the cross-section indicated by arrows C and D in FIG. 4. The cross-section indicated by arrows C and D intersects one of the inlets 404 and portions 508 of the cooling passageways 402. However, the cross-section intersects an area of the combustion liner 202 between the outlets 406, so no outlets 406 are visible in FIG. 5.

Figure 6:
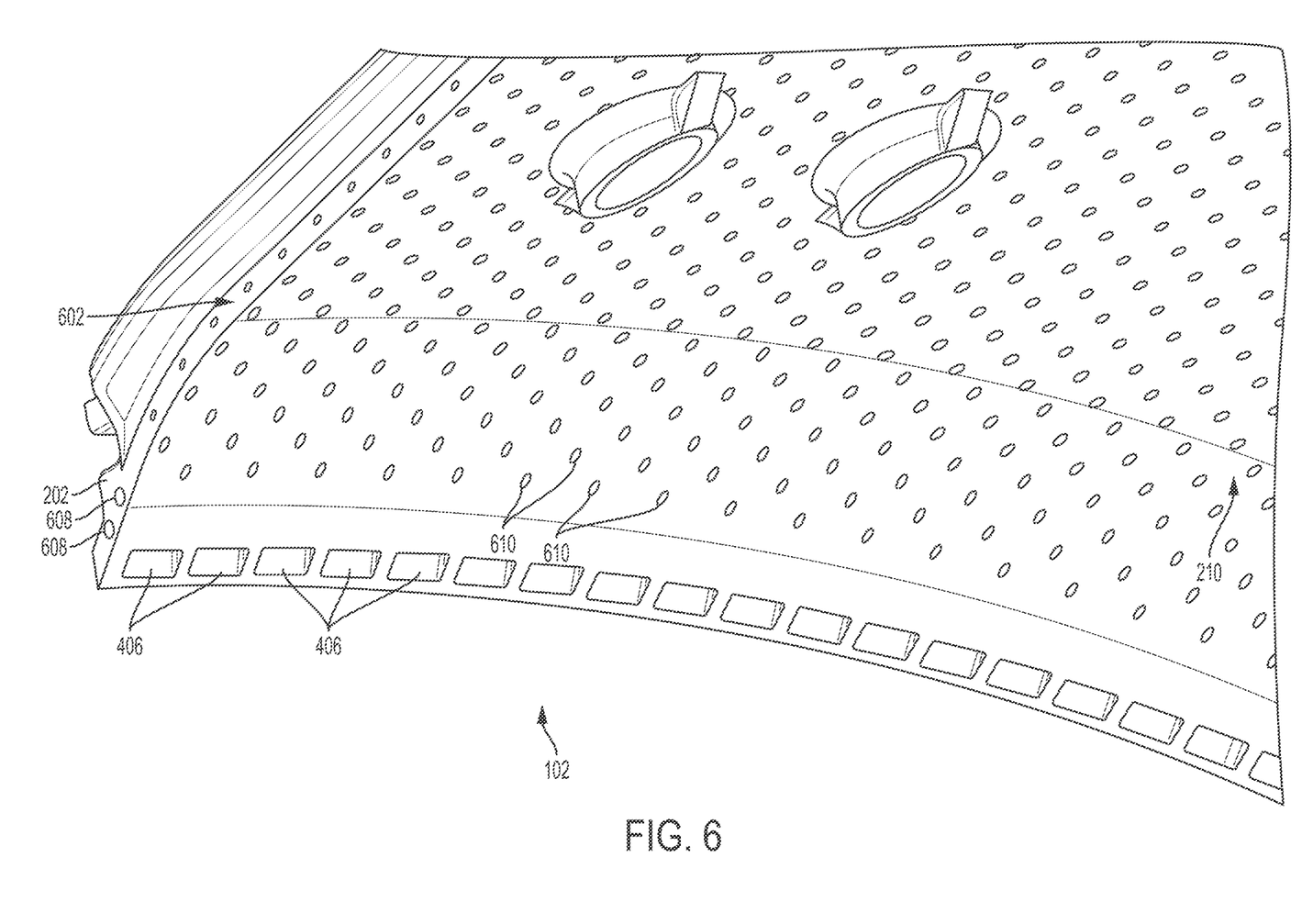
FIG. 6 is a perspective view of the aft end of the combustion liner showing the hot side of the combustion liner.

FIG. 6 is a perspective view of the aft end of the combustion liner 202 showing the hot side 210 of the combustion liner 202. The portion of the combustion liner 202 shown in FIG. 6 is a corner of a tile. Again, the cooling passages 402 are largely hidden from view. However, the outlets 406, which are located on the hot side 210 of the combustion liner 202, are clearly visible. Only a subset of the outlets 406 shown in FIG. 6 are indicated by lead lines. Also visible in FIG. 6 are openings 608 into the cooling passageways 402, which are on an edge side 602 of the tile. The edge side 602 of the tile is configured to abut an adjacent tile that has corresponding openings, which align with the openings 608 on the edge side 602 of the tile shown in FIG. 6. Multiple tiles like the one shown in FIG. 6 may be arranged to form a complete annular combustion liner.

Figure 7:
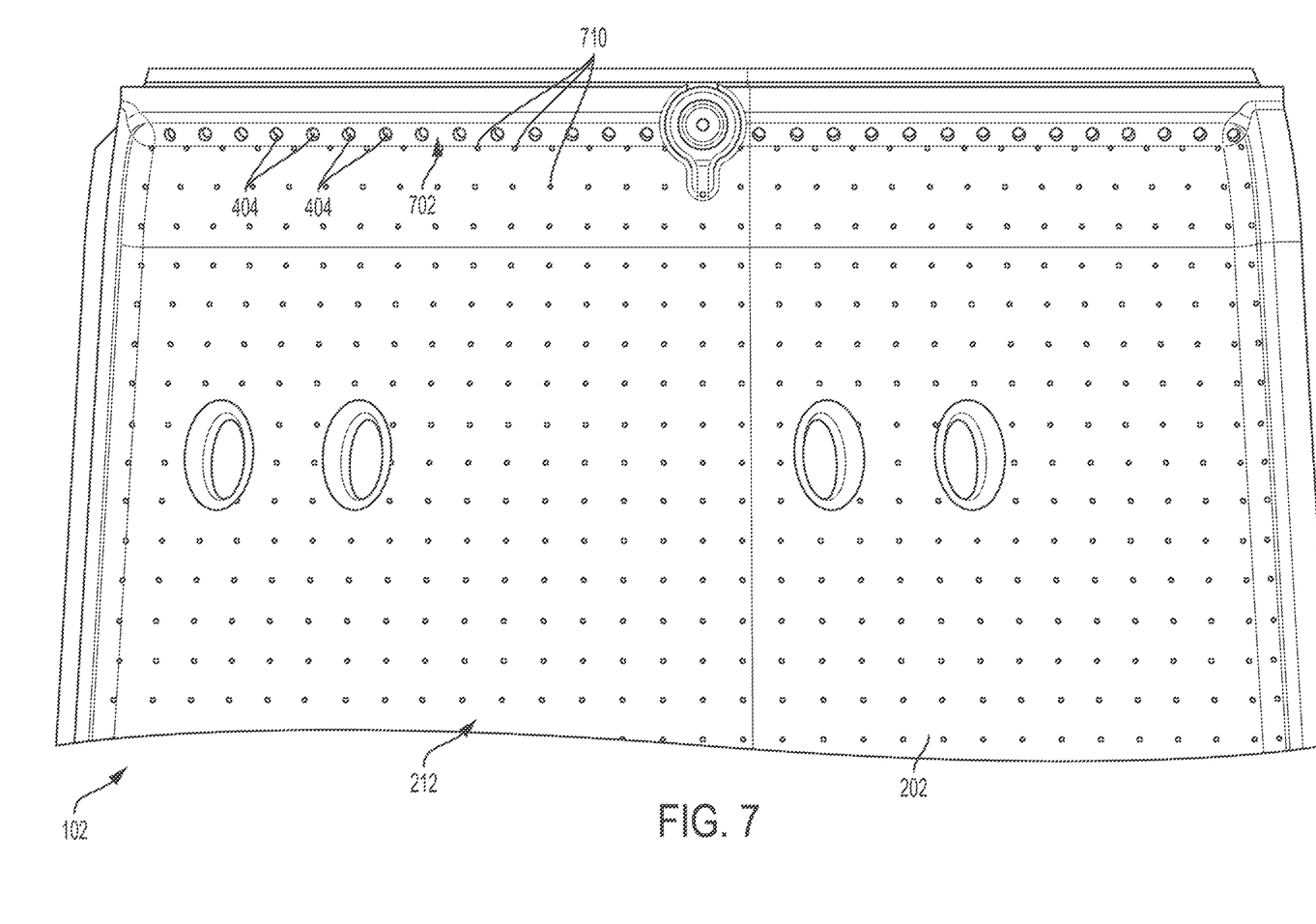
FIG. 7 is a perspective view of the aft end of the combustion liner showing the cold side of the combustion liner.

FIG. 7 is a perspective view of the aft end of the combustion liner 202 showing the cold side 212 of the combustion liner 202. The portion of the combustion liner 202 shown in FIG. 7 is a complete aft end of a tile. In FIG. 7, the cooling passages 402 are hidden from view except for the inlets 404. Only a subset of the inlets 404 shown in FIG. 7 are indicated by lead lines. In the illustrated example, the inlets 404 are located on a curved section 702 on the cold side 212 of the combustion liner 202.

During operation of the system 102 for combustor cooling and trim air profile control, cooling fluid 214 flows along the cold side 212 of the combustion liner 202 in an aft direction. The cooling fluid 214 approaches the curved section 702 of the combustion liner 20 and then enters the inlets 404 located on the curved section 702. The cooling fluid 214 flows through the cooling passages 402 in the combustion liner 202. As the cooling fluid 214 flows through the cooling passages 402, the cooling fluid 214 cools the combustion liner 202 in the seal engagement region 206. The cooling fluid 214 exits the combustion liner 202 through the outlets 406. The cooling fluid 214 that exits through the outlets 406 cools the gases in the primary gas flow path 208. As a result, the cooling fluid 214 that exits through the outlets 406 acts as trim air that affects the combustor exit temperature profile.

Design requirements may stipulate the shape of the temperature profile of gasses exiting the combustor in the primary gas flow path 208. For example, lowering the temperature of the gases in radially outer regions of the primary gas flow path 208 in the turbine section 110 may help prolong the life of the blades 112 and/or vanes in the turbine section 110.

The speed, quantity, and/or angle of the cooling fluid 214 that exits the outlets 406, and/or the size and shape of the outlets 406 may be selected to control the trim air and, consequently, the shape of the temperature profile of gasses exiting the combustor and entering the turbine section 110. For example, trim air jet penetration may be increased by decreasing a ratio of the area of the outlets 406 to the area of the inlets 404. Specifically, decreasing the ratio of the area of the outlets 406 to the area of the inlets 404 may increase the momentum of the cooling fluid 214 exiting the outlets 406, thus increasing trim air jet penetration. Conversely, increasing the ratio of the area of the outlets 406 to the area of the inlets 404 may decrease trim jet penetration. Alternatively or in addition, trim air jet penetration may be increased by steepening the angle of the cooling passages 402 at the outlets 406. Steepening the angle of the cooling passages 402 at the outlets 406 means orienting the cooling passages 402 to eject the cooling fluid 214 closer to a radially inward direction, which is perpendicular to the primary gas flow path 208.

Trim holes, which have trim hole inlets 710 on the cold side 212 of the combustion liner 202 and trim hole outlets 610 on the hot side 210 of the combustion liner 202, may also control the trim air and, consequently, the shape of the temperature profile of gasses exiting the combustor and entering the turbine section 110. Not all of the trim hole inlets 710 and the trim hole outlets 610 are indicated with lead lines in FIGS. 6 and 7. The trim hole outlets 610 may be larger than the trim hole inlets 710 in some examples, such as the example illustrated in FIGS. 2-7. The trim holes may be angled with respect to the cold side 212 and/or the hot side 210. The trim holes may be machined, for example by drilling, into the combustion liner 202. However, unlike the cooling passages 402 described herein, the trim holes cannot extend the trim air cooling effect to the end of the combustion liner 202 because structures in the seal engagement region 206, such as the aft seal 204 and the portion of the combustion liner 202 that engages the aft seal 204, may get in the way. For example, even drilling the trim holes at an angle may be insufficient to reach into the seal engagement region 206 and/or to position the trim hole outlets 610 as far aft as the outlets 406 of the cooling passages 402 discussed earlier above. Furthermore, the cooling passages 402 may use less of the cooling fluid 214 with the cooling passages 402 to obtain a target temperature profile than without the cooling passages 402. Using less cooling fluid for cooling allows more to be used for combustion, which may be more and more important for high performance, high thrust engines.

Referring back to FIG. 4, the cooling passages 402, which pass through the seal engagement region 206 of the combustion liner 202, may have a more complex shape than the trim holes. In the example shown in FIG. 4, each of the inlets 404 opens into a corresponding cylindrical cooling passage 410, which is angled down into the combustion liner 202 and toward the seal engagement region 206. The corresponding cylindrical cooling passage 410 expands into a supply passageway 412 that has a substantially rectangular cross-section and extends substantially parallel to the hot side 210 of the combustion liner 202 in an aft direction 414. Adjacent supply passageways 412 are connected via oval passageways 416 that extend in a circumferential direction 418, which is substantially perpendicular to the aft direction 414 (not all of the oval passageways 416 are indicated by lead lines in FIG. 4). An array of pedestals 420 are located in the supply passageways 412 and between adjacent supply passageways 412 (not all of the pedestals 420 are indicated by lead lines in FIG. 4). The pedestals 420 that are located between any two adjacent supply passageways 412 may define, at least in part, the oval passageways 416 that connect the two adjacent supply passageways 412. The pedestals 420 help maintain the structural integrity of the combustion liner 202 and also aid in increasing the cooling effect of the cooling fluid 214 that flows through the cooling passageways 412. The supply passageways 412 lead into exit passageways 422, which in turn lead to the outlets 406. Accordingly, the exit passageways 422 are angled toward the hot side 210 of the combustion liner 202 in the aft direction 414. Each of the exit passageways 422 and corresponding one of the outlets 406 are located between two corresponding adjacent supply passageways 412 (and, therefore, between two corresponding adjacent inlets 404). In other words, the inlets 404 and the outlets 406 are offset from one another.

The exit passageways 422 and/or the corresponding outlets 406 may be in the form of a series of slots. Alternatively, the exit passageways 422 and/or the outlets 406 may be cylindrical or any other suitable shape.

The system 102 for combustor cooling and trim air profile control may be implemented in many different ways. For example, the system 102 may include only the part of the aft end of the combustion liner 202 that includes the cooling passageways 402 in the seal engagement region 206. Alternatively, the system 102 may include only a combustion liner tile that includes the cooling passageways 402 in the seal engagement region 206. Alternatively or in addition, the system 102 may include the combustion liner 202, which includes a complete annular combustion liner or a subset thereof, wherein the cooling passageways 402 are in the seal engagement region 206 of the combustion liner 202. In some examples, the system 102 may include one or more components in addition to combustion liner 202, such as the aft seal 204.

In some examples, the combustion liner 202 is part of an annular combustion chamber. A combustion liner for an annular combustion chamber includes an outer combustion liner and an inner combustion liner. The combustion liner 202 may be an outer combustion liner if the hot side 210 of the combustion liner 202 faces radially inward toward the centerline X of the gas turbine engine 100, and if the cold side 212 of the combustion liner 202 faces radially outward from the centerline X. Alternatively, the combustion liner 202 may be an inner combustion liner if the hot side 210 of the combustion liner 202 faces radially outward away from the centerline X of the gas turbine engine 100, and if the cold side 212 of the combustion liner 202 faces radially inward toward the centerline X. The aft end of the inner combustion liner may have, in some examples, the same structure as the outer combustion liner but inverted. Alternatively, the structure of the aft end of the inner combustion liner may be different than the outer combustion liner.

In some examples, the combustion liner 202 is part of a can-annular combustor. A can-annular combustor may comprise an annular outer shell and a number of individual cylindrical liners mounted about the centerline X of the gas turbine engine 100. The combustion liner 202, such as the one illustrated in FIGS. 2-7, may be any of the cylindrical liners for a can-annular combustor.

In the example illustrated in FIGS. 2-7, the inlets 404 are located in the curved section 702 on the cold side 212 of the combustion liner 202. Moving in the aft direction 414 along the curved section 702, the cold side 212 on the curved section 702 curves away from the hot side 210. The curved section 702 may aid in directing the cooling fluid 214 into the inlets 404. Alternatively, the inlets 404 may not be located on a curved section 702 on the cold side 212. More generally, the inlets 404 to the cooling passageways 402 are formed in the cold side 212 of the combustion liner 202 and are configured to receive the cooling fluid 214.

The inlets 404 and/or the outlets 406 may be arranged uniformly, irregularly, or a combination thereof, in the circumferential direction 418. The inlets 404 and/or the outlets 406 may be oriented in any direction relative to the cold side 212 and the hot side 210, respectively.

The cooling passageways 402 may have any suitable structure and, therefore, be different than illustrated in FIGS. 2-7. For example, corresponding pairs of the inlets 404 and the outlets 406 may be aligned along an axial axis instead of being offset from each other as shown in FIG. 4. As another example, the cooling passageways 402 may not include the oval passageways 416 that extend in the circumferential direction 418 and connect the adjacent supply passageways 412. Alternatively or in addition, each of the supply passageways 412 may be a discrete passageway, unconnected to any of the other supply passageways 412. Alternatively or in addition, the combustion liner 202 may not include the openings 608 on the edge side 602 of the tile to the cooling passageways 402. Alternatively or in addition, the combustion liner 202 may not include the pedestals 420. For example, the supply passageways 412 may connect a corresponding one of the inlets 404 with a corresponding one of the outlets 406 without including any pedestal on the path from the inlet 404 to the outlet 406. Alternatively or in addition, the shapes and/or dimensions of the cooling passages 402 may vary from example to example.

As noted above, the seal engagement region 206 may be a portion of the combustion liner 202 that is configured to engage or otherwise couple to the aft seal 204. Referring to FIG. 3, the portion of the combustion liner 202 that is included in the seal engagement region 206 may be any portion bounded by a first plane 426 and a second plane 428, where the first plane 426 is parallel to the second plane 428, where the first plane 426 and the second plane 428 are perpendicular to an axis that extends in the aft direction 414, where the first plane 426 intersects a point 430 at which the combustion liner 202 is configured to contact or engage the aft seal 204, and where the second plane 428 intersects an end surface 432 of the combustion liner 202 configured to face the aft direction 414. The first and second planes 426 may be parallel to an axis 424 that extends radially from a longitudinal axis of the combustion liner 202. The axis 424 that extends radially from the longitudinal axis is perpendicular to both the axis that extends in the aft direction 414 and an axis that extends in the circumferential direction 418. Alternatively or in addition, the seal engagement region 206 may be the portion of the combustion liner 202 between the end surface 432 and a point on the hot side 210 that cannot be reached by drilling a trim hole from the cold side 212 further to the fore (opposite of the aft direction 414) than the curved section 702. Alternatively or in addition, the seal engagement region 206 may be the portion of the combustion liner 202 that is radially inward from a portion of the combustion liner 202 that receives and/or abuts the aft seal 204. The combustion liner 202 and the aft seal 204 may overlap in the seal engagement region 206 such that one or more of the outlets 406 are radially inward of at least part of the aft seal 204.

Figure 8:
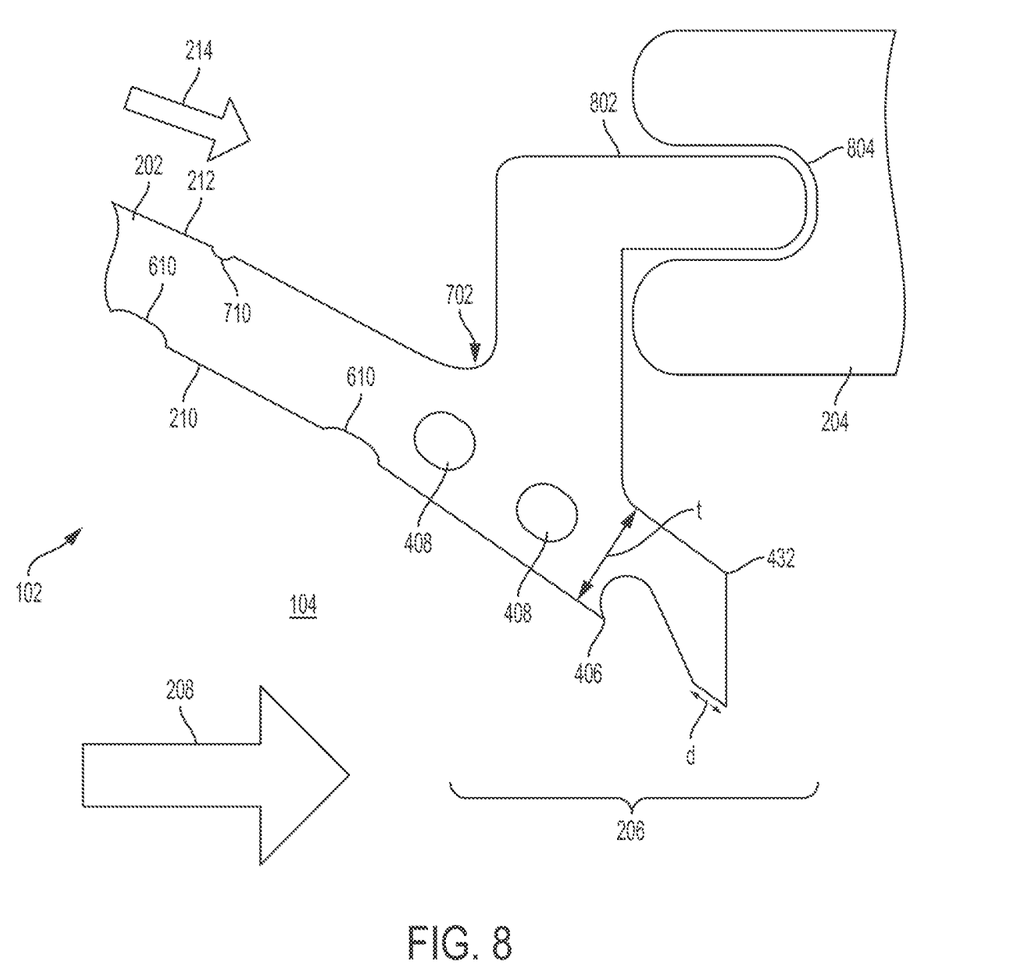
FIG. 8 is a cross-section view of a second example of a seal engagement region.

The seal engagement region 206 may have an entirely different structure than the example illustrated in FIGS. 2-7. The structure of the seal engagement region 206 may vary from example to example because the means for connecting—and/or sealing a gap between—the combustion liner 202 and the high pressure vanes varies widely from design to design. In the example illustrated in FIGS. 2-7, the aft seal 204 is enveloped at least partly by an aft-facing U-shaped portion of the combustion liner 202 within the seal engagement region 206. In other examples, the aft seal 204 may be enveloped at least partly by a differently shaped and/or oriented portion of the combustion liner 202 within the seal engagement region 206. FIG. 8 illustrates yet another example of the seal engagement region 206. In the example shown in FIG. 8, the aft seal 204 is a U-shaped groove 804 in a high pressure vane. The U-shaped groove 804 is configured to face in the fore direction and to receive a "porpoise nose" portion 802 or an aft-facing projection of the combustion liner 202. The seal engagement region 206 includes an area radially inward from the "porpoise nose" portion 802, which includes, for example, the outlets 406 of the cooling passages 402.

The distance from the outlet 406 of one of the cooling passages 402 to the end surface 432 of the combustion liner 202 is designated "d" in FIG. 2. The thickness of the combustion liner 202 is designed "t" in FIG. 2. In some examples, the ratio of d to t may be in a range of ½ to ¼. Alternatively, the ratio of d to t may be outside of the range of ½ to ¼. The outlet 406s of the cooling passages 402 may be configured to direct a stream of the cooling fluid 214 beyond the end surface 432 of the combustion liner 202.

The cross-sectional area of each of the outlets 406 may be greater than or equal to a cross-sectional area of a corresponding one of the inlets 404. In some examples, a ratio of the cross-sectional area the outlet 406 to the cross-sectional area of the inlet 404 may be in a range from 1.8 to 2.2. Alternatively, the ratio of the cross-sectional area the outlet 406 to the cross-sectional area of the inlet 404 may be outside of the range from 1.8 to 2.2.

The cross-sectional area of one or more of the inlets 404 may be at least twice the cross-sectional area of one or more of the trim hole inlets 710. Alternatively or in addition, the ratio between the cross-sectional area of the inlet 404 and the cross-sectional area of the trim hole inlets 710 may be less than two.

In some examples, the combustion liner 202 may be a double wall component comprising an outer wall that includes the hot side 210 and an inner wall that includes the cold side 212. One or more of the pedestals 420 may be coupled at a first end of the pedestal(s) to the outer wall and a second end of the pedestal(s) to the inner wall.

During operation of some examples of the system 102, the cooling fluid 214 may be received at the inlet 404 on the outer surface 212 of the combustion liner 202 for a combustor of the gas turbine engine 100. The cooling fluid 214 may be directed through one or more of the cooling passageways 402 located in the combustion liner 202 radially inward of the aft seal 204 that overlaps the combustion liner 202. The cooling fluid 214 may be directed from the one or more of the cooling passageways 402 through one or more of the outlets 406 into the primary gas flow path 208, wherein the one or more of the outlets 406 is located radially inward of the aft seal 204. The operations may be carried out in the order listed in this paragraph. Alternatively, the operations may be carried out in a different order.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
   a combustion liner configured to be included in an aft end of a combustor for a gas turbine engine; and
   an aft seal movably engaged with the combustion liner in a seal engagement region, wherein the combustion liner comprises
   an inlet formed in an outer surface of the combustion liner to receive a cooling fluid, and
   an outlet in fluid communication with the inlet via a passageway formed within the combustion liner, the outlet disposed in an inner surface of the combustion liner in the seal engagement region.
2. The system of aspect 1, wherein the outlet is configured to direct a stream of the cooling fluid into an exhaust gas stream in a primary gas flow path of the gas turbine engine.
3. The system of any of aspects 1 to 2, wherein the outlet is configured to direct a stream of the cooling fluid beyond an aft end of the combustion liner.
4. The system of any of aspects 1 to 3, wherein the combustion liner comprises trim holes and the inlet that is in fluid communication with the outlet is further aft than the trim holes.

5. The system of any of aspects 1 to 4, wherein the combustion liner and a portion of the aft seal overlap in the seal engagement region and the outlet is radially inward of the aft seal.

6. The system of any of aspects 1 to 5, wherein the inlet is outside of the seal engagement region, and the passageway in the seal engagement region includes a supply passageway that is substantially parallel to the inner surface of the combustion liner.

7. The system of any of aspects 1 to 6, wherein at least a portion of the aft seal is nested inside of the combustion liner and the outlet is radially inward from the portion of the aft seal nested inside the combustion liner.

8. The system of any of aspects 1 to 7, wherein the inlet comprises a plurality of inlets in fluid communication with the passageway, and the outlet comprises a series of slots in fluid communication with the passageway.

9. A combustion liner for a gas turbine engine, the combustion liner comprising:
   a seal engagement region configured to couple with an aft seal;
   a plurality of cooling passages in the seal engagement region;
   a plurality of inlets to the cooling passages, the inlets located on an outer surface of the combustion liner; and
   a plurality of outlets for the cooling passages, the outlets located on an inner surface of the combustion liner in the seal engagement region, wherein the inner surface is configured to face radially inward toward a combustion chamber, and the outer surface is configured to face radially outward relative to the combustion chamber.

10. The combustion liner of aspect 9, wherein the inlets are located on a curved section of the outer surface of the combustion liner, where the curved section curves radially outward from the inner surface of the combustion liner.

11. The combustion liner of any of aspects 9 to 10 further comprising a plurality of trim hole inlets on the outer surface of the combustion liner, wherein the inlets to the cooling passageways have a larger cross-sectional area than the trim hole inlets.

12. The combustion liner of any of aspects 9 to 11, wherein each of the inlets opens into a corresponding cylindrical cooling passage, the corresponding cylindrical cooling passage is disposed within the combustion liner at an angle relative to the inner surface, the corresponding cylindrical cooling passage expands into a supply passageway that has a substantially rectangular cross-section and extends substantially parallel to the inner surface of the combustion liner in an aft direction, and the supply passageway is included within the seal engagement region.

13. The combustion liner of any of aspects 9 to 12 further comprising at least one pedestal disposed in at least one of the cooling passages.

14. The combustion liner of aspect 13, wherein the combustion liner is a double wall component comprising an outer wall that includes the outer surface and an inner wall that includes the inner surface, the pedestal coupled at a first end to the outer wall and a second end to the inner wall.

15. The combustion liner of any of aspects 9 to 14, wherein a distance from a corresponding one the outlets to an aft end surface of the combustion liner divided by a thickness of the combustion liner at the corresponding one of the outlets is in a range of ½ to ¼.

16. The combustion liner of any of aspects 9 to 15, wherein the combustion liner is at least an aft end of combustor tile.

17. A method comprising:
   receiving a cooling fluid at an inlet on an outer surface of a combustion liner for a combustor of a gas turbine engine;
   directing the cooling fluid through a passageway located in the combustion liner radially inward of an aft seal that overlaps the combustion liner; and
   directing the cooling fluid from the passageway through an outlet of the combustion liner into a primary gas flow path, wherein the outlet is located radially inward of the aft seal.

18. The method of aspect 17, wherein receiving the cooling fluid comprises receiving the cooling fluid at a curved section of the outer surface, wherein the curved section is curved further away from an inner surface of the combustion liner in an aft direction than in a fore direction.

19. The method of any of aspects 17 to 18, wherein directing the cooling fluid into the primary gas flow path includes injecting the cooling fluid beyond an aft end of the combustion liner.

20. The method of any of aspects 17 to 19, further comprising routing the cooling fluid in the passageway around a pedestal included in the passageway.

What is claimed is:

1. A system comprising:
   a combustion liner configured to be included in an aft end of a combustor for a gas turbine engine; and
   an aft seal movably engaged with the combustion liner in a seal engagement region, wherein the combustion liner comprises:
      a plurality of cooling passages in the seal engagement region, wherein at least one pedestal is disposed in at least one of the cooling passages;
      a plurality of inlets to the cooling passages, the inlets formed in an outer surface of the combustion liner to receive a cooling fluid, and
      a plurality of outlets for the cooling passages in fluid communication with the inlets, the outlets disposed in an inner surface of the combustion liner in the seal engagement region, the inner surface being configured to face radially inward toward a combustion chamber, and the outer surface being configured to face radially outward relative to the combustion chamber,
   wherein the combustion liner is a double wall component comprising an outer wall including the outer surface and an inner wall including the inner surface, and wherein the pedestal is coupled at a first end to the outer wall and at a second end to the inner wall.

2. The system of claim 1, wherein the outlets are configured to direct a stream of the cooling fluid into an exhaust gas stream in a primary gas flow path of the gas turbine engine.

3. The system of claim 1, wherein the outlets are configured to direct a stream of the cooling fluid beyond an aft end of the combustion liner.

4. The system of claim 1, wherein the combustion liner comprises trim holes and wherein the inlets in fluid communication with the outlets are further aft than the trim holes.

5. The system of claim 1, wherein the combustion liner and a portion of the aft seal overlap in the seal engagement region and the outlets are radially inward of the aft seal.

6. The system of claim 1, wherein the inlets are outside of the seal engagement region, and the cooling passages in the seal engagement region includes a supply passageway that is substantially parallel to the inner surface of the combustion liner.

7. The system of claim 1, wherein at least a portion of the aft seal is nested inside of the combustion liner and the outlets are radially inward from the portion of the aft seal nested inside the combustion liner.

8. A combustion liner for a gas turbine engine, the combustion liner comprising:
   a seal engagement region configured to couple with an aft seal;
   a plurality of cooling passages in the seal engagement region;
   a plurality of inlets to the cooling passages, the inlets located on an outer surface of the combustion liner; and
   a plurality of outlets for the cooling passages, the outlets located on an inner surface of the combustion liner in the seal engagement region, wherein the inner surface is configured to face radially inward toward a combustion chamber, and the outer surface is configured to face radially outward relative to the combustion chamber,
   wherein each of the inlets opens into a corresponding cylindrical cooling passage disposed within the combustion liner at an angle relative to the inner surface, the corresponding cylindrical cooling passage expanding into a supply passageway having a substantially rectangular cross-section and extending substantially parallel to the inner surface of the combustion liner in an aft direction, wherein the supply passageway is included within the seal engagement region.

9. The combustion liner of claim 8, wherein the inlets are located on a curved section of the outer surface of the combustion liner, where the curved section curves radially outward from the inner surface of the combustion liner.

10. The combustion liner of claim 8 further comprising a plurality of trim hole inlets on the outer surface of the combustion liner, wherein the inlets to the cooling passageways have a larger cross-sectional area than the trim hole inlets.

11. The combustion liner of claim 8, further comprising at least one pedestal disposed in at least one of the cooling passages.

12. The combustion liner of claim 11, wherein the combustion liner is a double wall component comprising an outer wall that includes the outer surface and an inner wall that includes the inner surface, the pedestal coupled at a first end to the outer wall and a second end to the inner wall.

13. The combustion liner of claim 8, wherein a distance from a corresponding one the outlets to an aft end surface of the combustion liner divided by a thickness of the combustion liner at the corresponding one of the outlets is in a range of ½ to ¼.

14. The combustion liner of claim 8, wherein the combustion liner is at least an aft end of combustor tile.

15. A method comprising:
   receiving a cooling fluid at a plurality of inlets on an outer surface of a combustion liner for a combustor of a gas turbine engine, the outer surface configured to face radially outward relative to a combustion chamber;
   directing the cooling fluid through a plurality of cooling passages located in the combustion liner radially inward of an aft seal that overlaps the combustion liner, wherein at least one pedestal is disposed in at least one of the cooling passages; and
   directing the cooling fluid from the cooling passages through a plurality of outlets of the combustion liner into a primary gas flow path, wherein the outlets are located radially inward of the aft seal and disposed in an inner surface of the combustion liner in a seal engagement region,
   wherein the combustion liner is a double wall component comprising an outer wall including the outer surface and an inner wall including an inner surface configured to face radially inward toward the combustion chamber, and wherein the pedestal is coupled at a first end to the outer wall and at a second end to the inner wall.

16. The method of claim 15, wherein receiving the cooling fluid comprises receiving the cooling fluid at a curved section of the outer surface, wherein the curved section is curved further away from an inner surface of the combustion liner in an aft direction than in a fore direction.

17. The method of claim 15, wherein directing the cooling fluid into the primary gas flow path includes injecting the cooling fluid beyond an aft end of the combustion liner.

18. The method of claim 15 further comprising routing the cooling fluid in the cooling passages around the pedestal.

19. A combustion liner for a gas turbine engine, the combustion liner comprising:
   a seal engagement region configured to couple with an aft seal;
   a plurality of cooling passages in the seal engagement region, wherein at least one pedestal is disposed in at least one of the cooling passages;
   a plurality of inlets to the cooling passages, the inlets located on an outer surface of the combustion liner; and
   a plurality of outlets for the cooling passages, the outlets located on an inner surface of the combustion liner in the seal engagement region, wherein the inner surface is configured to face radially inward toward a combustion chamber, and the outer surface is configured to face radially outward relative to the combustion chamber,
   wherein the combustion liner is a double wall component comprising an outer wall including the outer surface and an inner wall including the inner surface, and wherein the pedestal is coupled at a first end to the outer wall and at a second end to the inner wall.

* * * * *

UNITED STATES PATENT AND TRADEMARK OFFICE
CERTIFICATE OF CORRECTION

PATENT NO. : 10,801,727 B2
APPLICATION NO. : 16/029206
DATED : October 13, 2020
INVENTOR(S) : Christopher Dwayne DeBruhl et al.

Page 1 of 1

It is certified that error appears in the above-identified patent and that said Letters Patent is hereby corrected as shown below:

In the Claims

In Column 10, Claim 1, Line 45, delete "wail" and insert in its place --wall--.

In Column 10, Claim 1, Line 46, delete "wail" and insert in its place --wall--.

In Column 10, Claim 6, Line 65, delete "includes" and insert in its place --include--.

Signed and Sealed this
Seventeenth Day of November, 2020

Andrei Iancu
*Director of the United States Patent and Trademark Office*